US012055109B1

(12) United States Patent
Tachibana et al.

(10) Patent No.: US 12,055,109 B1
(45) Date of Patent: Aug. 6, 2024

(54) GASEOUS FUEL SUPPLY DEVICE (71) Applicant: TOYOTA JIDOSHA KABUSHIKI KAISHA, Toyota (JP)

(72) Inventors: Mina Tachibana, Toyota (JP); Yuki Suzuki, Kariya (JP); Tomihisa Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/539,286

(22) Filed: Dec. 14, 2023

(30) Foreign Application Priority Data

Jan. 19, 2023 (JP) ................................ 2023-006482

(51) Int. Cl.
*F02D 41/00* (2006.01)
(52) U.S. Cl.
CPC .. *F02D 41/0027* (2013.01); *F02D 2200/0602* (2013.01)
(58) Field of Classification Search
CPC .............. F02D 41/0027; F02D 2200/0602
See application file for complete search history.

(56) References Cited

U.S. PATENT DOCUMENTS 5,483,943 A * 1/1996 Peters .................... F02M 21/06
123/557
2013/0174811 A1 7/2013 Nishimura et al.
2013/0340715 A1* 12/2013 Pursifull ............. F02D 19/0676
123/464

FOREIGN PATENT DOCUMENTS

JP 2017145818 A 8/2017
JP 2023168841 A * 11/2023
WO 2012144022 A1 10/2012

* cited by examiner

*Primary Examiner* — Kevin A Lathers (57) ABSTRACT

A gaseous fuel supply device includes processing circuitry configured to control a direct injection valve and a shut-off valve. The processing circuitry determines an energization time for the direct injection valve based on a pressure of gaseous fuel supplied from a supply passage to the direct injection valve. When a temperature of the direct injection valve becomes greater than a temperature determination value, the processing circuitry starts an opening-closing process that repeatedly switches the shut-off valve between a closed state and an open state. The opening-closing process is a process that brings the shut-off valve into the closed state when the pressure of the gaseous fuel supplied to the direct injection valve is greater than a pressure lower limit value and brings the shut-off valve into the open state when the pressure of the gaseous fuel becomes less than or equal to the pressure lower limit value.

3 Claims, 5 Drawing Sheets

GASEOUS FUEL SUPPLY DEVICE

BACKGROUND

1. Field

The present disclosure relates to a gaseous fuel supply device that supplies gaseous fuel into a cylinder of an internal combustion engine.

2. Description of Related Art

Japanese Laid-Open Patent Publication No. 2017-145818 discloses an internal combustion engine in which gaseous fuel is injected into a cylinder from a direct injection valve. The cylinder defines a combustion chamber in which combustion gas containing gaseous fuel and air burns.

The tip of the direct injection valve receives heat from a high-temperature combustion gas in the combustion chamber and thus becomes extremely hot. Consequently, this can lead to a reduced lifespan of the direct injection valve.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a gaseous fuel supply device for an internal combustion engine having a cylinder. The gaseous fuel supply device includes a direct injection valve configured to inject gaseous fuel into the cylinder, a storage tank configured to store gaseous fuel, a supply passage configured to guide the gaseous fuel from the storage tank to the direct injection valve, a pressure reducing valve disposed in the supply passage and configured to reduce a pressure of the gaseous fuel that has flowed out from the storage tank to the supply passage, and a shut-off valve disposed in a portion of the supply passage downstream of the pressure reducing valve. The shut-off valve is configured to be switched between an open state in which supply of the gaseous fuel to the direct injection valve is permitted and a closed state in which supply of the gaseous fuel to the direct injection valve is stopped. The gaseous fuel supply device also includes processing circuitry configured to control the direct injection valve and the shut-off valve. The processing circuitry is configured to determine an energization time for the direct injection valve based on the pressure of the gaseous fuel supplied from the supply passage to the direct injection valve and a requested value of an injection amount of the gaseous fuel from the direct injection valve and, when a temperature of the direct injection valve becomes greater than a temperature determination value during operation of the internal combustion engine, start an opening-closing process that repeatedly switches the shut-off valve between the closed state and the open state. The opening-closing process is a process that brings the shut-off valve into the closed state when the pressure of the gaseous fuel supplied from the supply passage to the direct injection valve is greater than a pressure lower limit value and brings the shut-off valve into the open state when the pressure of the gaseous fuel supplied to the direct injection valve becomes less than or equal to the pressure lower limit value.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the modes, devices, and/or systems described. Modifications and equivalents of the modes, devices, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A first embodiment will now be described with reference to FIGS. 1 to 4.

Figure 1:
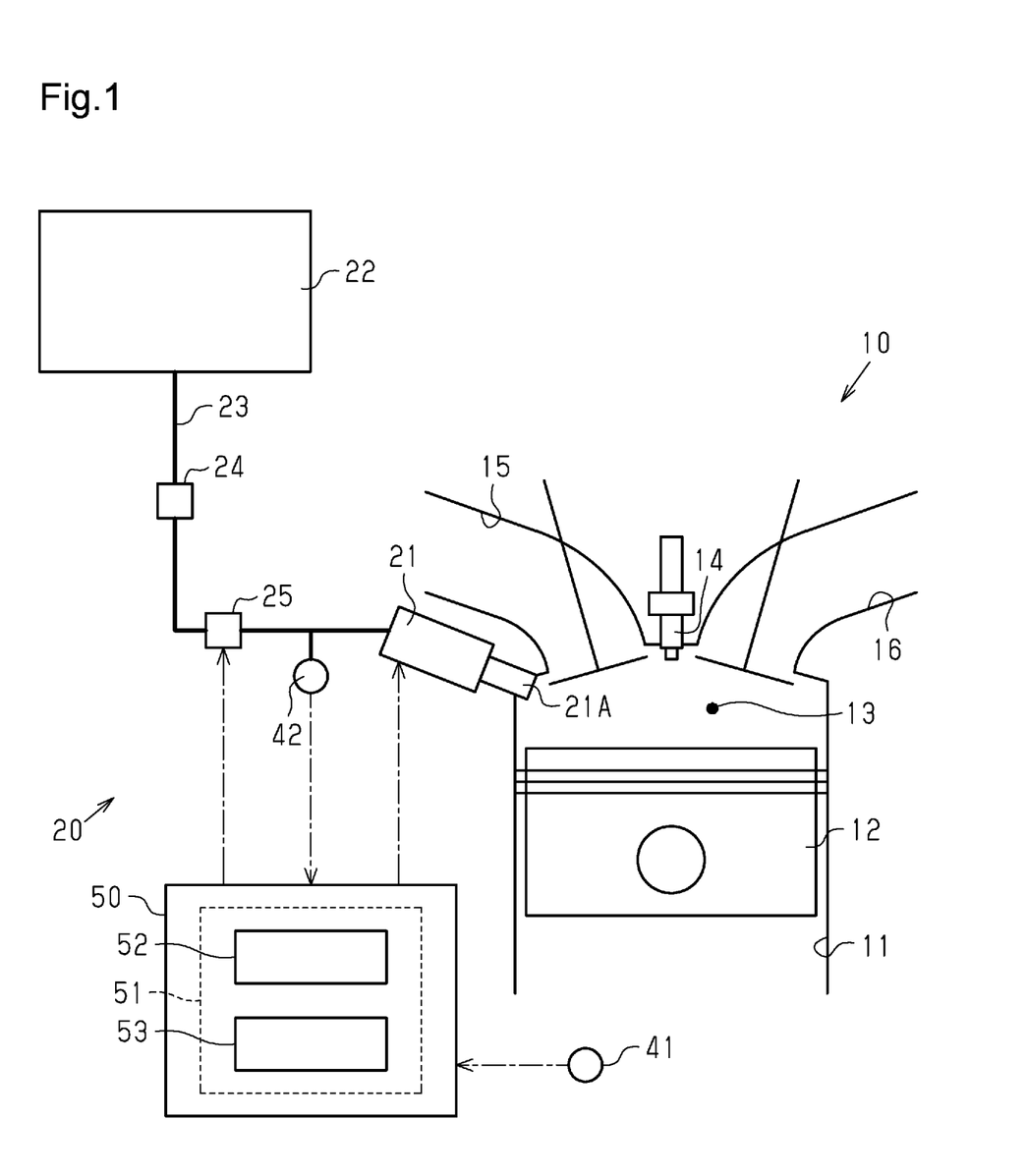
FIG. 1 is a diagram schematically showing the configuration of a gaseous fuel supply device according to a first embodiment and an internal combustion engine in which the gaseous fuel supply device is employed.

FIG. 1 shows a gaseous fuel supply device 20 and an internal combustion engine 10 to which gaseous fuel is supplied from the gaseous fuel supply device 20. The gaseous fuel supply device 20 supplies hydrogen gas as gaseous fuel to the internal combustion engine 10. That is, the internal combustion engine 10 is a hydrogen gas engine that uses hydrogen gas as fuel.

Internal Combustion Engine

The internal combustion engine 10 includes one or more cylinders 11. A piston 12 is accommodated in each cylinder 11 in a reciprocatable manner. A combustion chamber 13 is defined in the cylinder 11 by the piston 12. The cylinder 11 includes an ignition plug 14 that ignites the hydrogen gas supplied to the combustion chamber 13.

The internal combustion engine 10 includes an intake passage 15 and an exhaust passage 16. Air flows through the intake passage 15 and is supplied to the combustion chamber 13. When the combustion gas containing hydrogen gas and air burns in the combustion chamber 13, exhaust gas is generated in the combustion chamber 13. The exhaust gas generated in the combustion chamber 13 is discharged to the exhaust passage 16.

Gaseous Fuel Supply Device

The gaseous fuel supply device 20 includes one or more direct injection valves 21, a storage tank 22, a supply passage 23, a pressure reducing valve 24, a shut-off valve 25, and a controller 50. The direct injection valve 21 injects hydrogen gas into the combustion chamber 13 in the cylinder 11. One direct injection valve 21 is provided for one cylinder 11. The configuration of the direct injection valve 21 will be described later.

The storage tank 22 stores high-pressure hydrogen gas.

The supply passage 23 guides the hydrogen gas from the storage tank 22 to the direct injection valve 21. That is, when the hydrogen gas flows out from the storage tank 22 to the supply passage 23, the hydrogen gas flows toward the direct injection valve 21 in the supply passage 23.

The pressure reducing valve 24 is located in the supply passage 23. The pressure reducing valve 24 is a mechanical valve that reduces the pressure of the high-pressure hydrogen gas that has flowed out from the storage tank 22 to the supply passage 23.

The shut-off valve 25 is located in the supply passage 23. The shut-off valve 25 is located at a portion of the supply passage 23 downstream of the pressure reducing valve 24. The shut-off valve 25 is configured to be switched between an open state and a closed state. In the open state, the supply of gaseous fuel to the direct injection valve 21 is permitted. In the closed state, the supply of gaseous fuel to the direct injection valve 21 is stopped. When the shut-off valve 25 is in the open state, the hydrogen gas in the storage tank 22 is supplied to the direct injection valve 21 through the supply passage 23. When the shut-off valve 25 is in the closed state, the hydrogen gas in the storage tank 22 is not supplied to the direct injection valve 21. However, since the hydrogen gas accumulated in the portion of the supply passage 23 downstream of the shut-off valve 25 can be supplied to the direct injection valve 21, the internal combustion engine 10 keeps running.

The shut-off valve 25 is an electronically controlled electromagnetic valve that operates based on an instruction from the controller 50.

Direct Injection Valve

Figure 2:
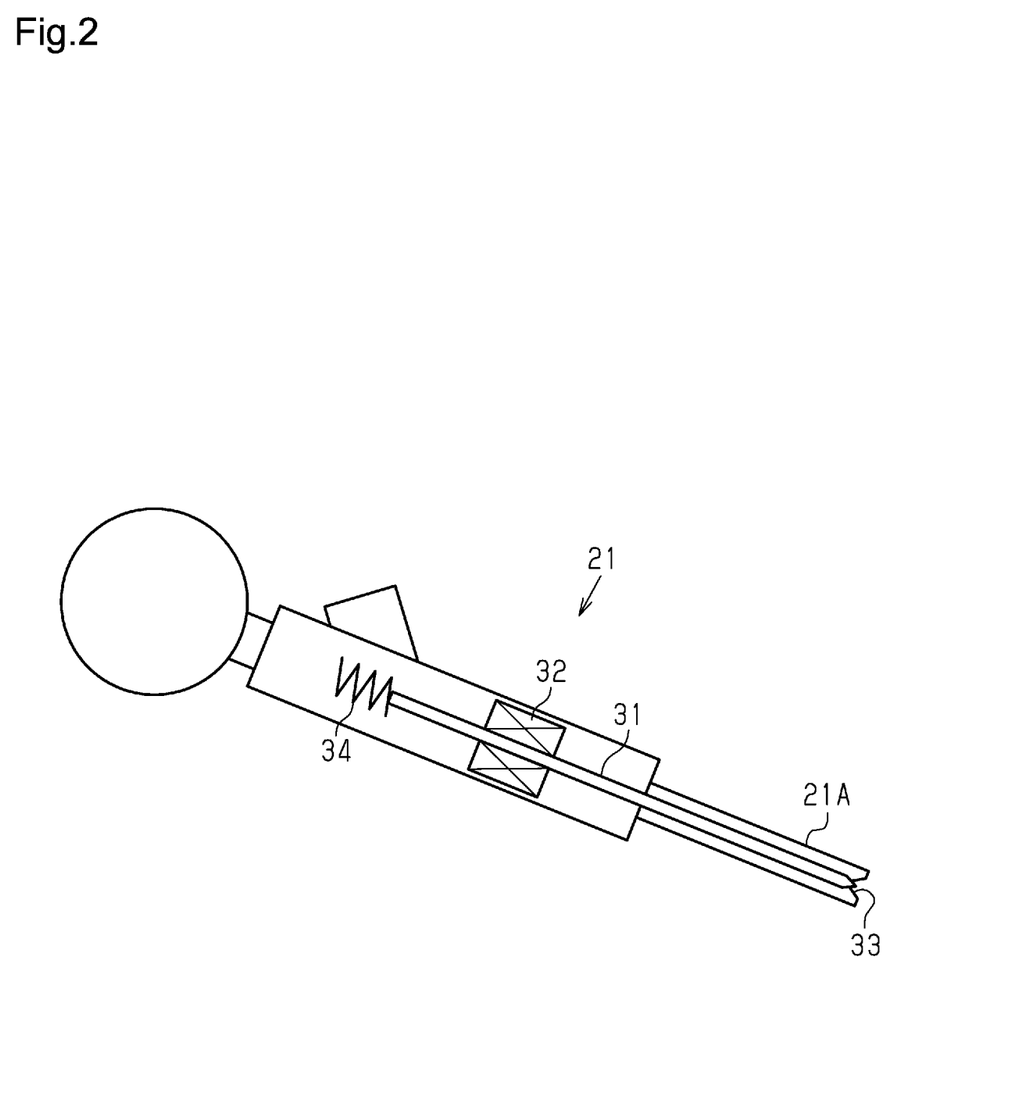
FIG. 2 is a diagram schematically showing the direct injection valve included in the gaseous fuel supply device of FIG. 1.

The direct injection valve 21 will be described with reference to FIG. 2. The direct injection valve 21 includes a needle 31, an electromagnetic solenoid 32, an nozzle hole 33, and a needle spring 34. Hydrogen gas is supplied to the direct injection valve 21 through a supply passage 23. The nozzle hole 33 connects the inside and the outside of the direct injection valve 21. The direct injection valve 21 is coupled to the internal combustion engine 10 in a state in which the nozzle hole 33 is exposed to the combustion chamber 13. The needle 31 is a valve body that opens and closes the nozzle hole 33. A protective film such as a DLC film is formed on the surface of the needle 31 to increase the rigidity of the needle 31. DLC is an abbreviation of diamond-like carbon. The electromagnetic solenoid 32 generates an electromagnetic attraction force for driving the needle 31 in a direction to open the nozzle hole 33 in response to energization. The needle spring 34 urges the needle 31 in a direction to close the nozzle hole 33. When the electromagnetic solenoid 32 is energized, the needle 31 moves away from the nozzle hole 33, so that the hydrogen gas in the direct injection valve 21 flows out from the nozzle hole 33.

A portion of the direct injection valve 21 exposed to the combustion chamber 13 is referred to as a tip 21A of the direct injection valve 21 (see FIG. 1).

Controller

As shown in FIG. 1, the controller 50 receives detection signals from sensors. The sensors include an air flow meter 41 and a fuel pressure sensor 42. The air flow meter 41 detects the flow rate of air flowing through the intake passage 15. The fuel pressure sensor 42 detects a fuel pressure, which is the pressure of the hydrogen gas supplied to the direct injection valve 21. Specifically, the fuel pressure sensor 42 detects the fuel pressure of a portion of the supply passage 23 downstream of the shut-off valve 25. The flow rate of air based on the detection signal of the air flow meter 41 is referred to as an intake air amount GA. The fuel pressure based on the detection signal of the fuel pressure sensor 42 is referred to as a supplied fuel pressure Pinj.

The controller 50 includes processing circuitry 51. For example, the processing circuitry 51 is an electronic control unit. In this case, the processing circuitry 51 includes a CPU 52 and a memory 53. The memory 53 stores a control program executed by the CPU 52. When the CPU 52 executes the control program, the processing circuitry 51 controls the direct injection valve 21 and the shut-off valve 25.

Control of Shut-Off Valve

Figure 3:
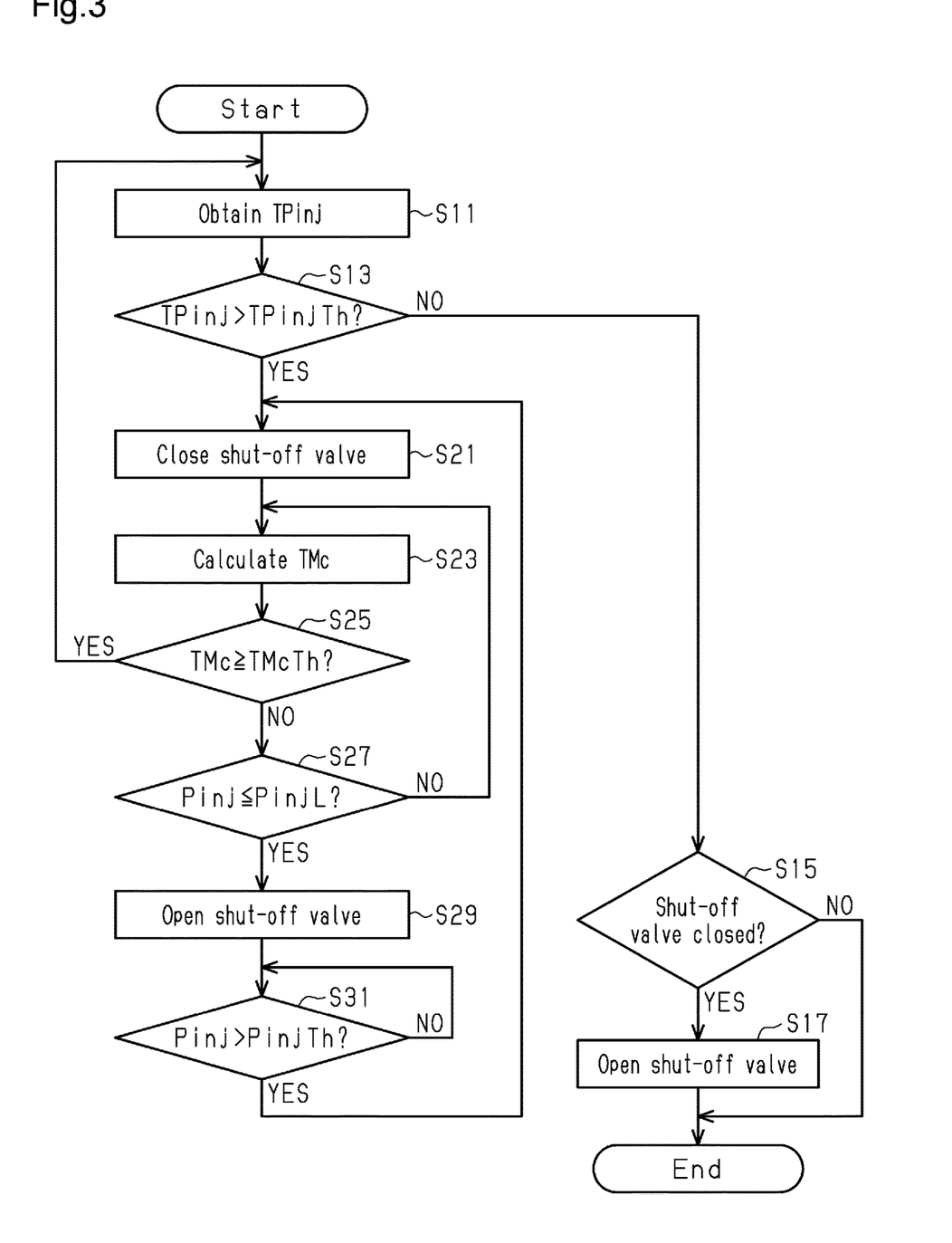
FIG. 3 is a flowchart illustrating a processing routine executed by the controller included in the gaseous fuel supply device of FIG. 1.

Referring to FIG. 3, a processing routine illustrating the flow of processes executed by the processing circuitry 51 to control the shut-off valve 25 will now be described. While the internal combustion engine 10 is running, the processing circuitry 51 repeatedly executes the processing routine.

In step S11, the processing circuitry 51 obtains an injection valve temperature TPinj, which is the temperature of the tip 21A of the direct injection valve 21. For example, the processing circuitry 51 obtains, as the injection valve temperature TPinj, an estimated value of the temperature based on the temperature of the combustion chamber 13 and the length of the period during which the direct injection valve 21 is open. The processing circuitry 51 increases the injection valve temperature TPinj as the temperature of the combustion chamber 13 increases. The processing circuitry 51 increases the injection valve temperature TPinj as the length of the opening period of the direct injection valve 21 becomes shorter.

In step S13, the processing circuitry 51 determines whether the injection valve temperature TPinj obtained in step S11 is greater than a temperature determination value TPinjTh. If the temperature of the tip 21A of the direct injection valve 21 becomes excessively high, the film formed on the surface of the needle 31 is likely to be worn. Thus, if the temperature of the tip 21A remains excessively high, the lifespan of the direct injection valve 21 is likely to be reduced. To solve this problem, the temperature determination value TPinjTh is set as a criterion for determining whether the temperature of the tip 21A is excessively high. When the injection valve temperature TPinj is less than or equal to the temperature determination value TPinjTh, it is determined that the protection of the direct injection valve 21 is yet unnecessary. When the injection valve temperature TPinj is greater than the temperature determination value TPinjTh, it is determined that the protection of the direct injection valve 21 is necessary. Thus, when the injection valve temperature TPinj is less than or equal to the temperature determination value TPinjTh (S13: NO), the processing circuitry 51 shifts the process to step S15.

In step S15, the processing circuitry 51 determines whether the shut-off valve 25 is in the closed state. When the shut-off valve 25 is in the closed state (S15: YES), the processing circuitry 51 shifts the process to step S17. When the shut-off valve 25 is not in the closed state (S15: NO), the shut-off valve 25 is in the open state and thus the processing circuitry 51 temporarily ends the present processing routine.

In step S17, the processing circuitry 51 opens the shut-off valve 25. Thereafter, the processing circuitry 51 temporarily ends the present processing routine.

In step S13, when the injection valve temperature TPinj is greater than the temperature determination value TPinjTh (S13: YES), the processing circuitry 51 starts an opening-closing process including steps S21 to S31. The opening-closing process is a process that repeatedly switches the shut-off valve 25 between the closed state and the open state.

Specifically, in step S21, the processing circuitry 51 closes the shut-off valve 25. As described above, the fuel injection of the direct injection valve 21 is continued even when the shut-off valve 25 is in the closed state. Thus, the pressure of the fuel supplied to the direct injection valve 21 gradually decreases. When the shut-off valve 25 is closed, the processing circuitry 51 shifts the process to step S23.

In step S23, the processing circuitry 51 calculates a valve-closed time cumulated value TMc. That is, the processing circuitry 51 calculates the cumulated value of the time during which the shut-off valve 25 is in the closed state as the valve-closed time cumulated value TMc during the execution of one opening-closing process. Upon completion of the opening-closing process, the processing circuitry 51 resets the valve-closed time cumulated value TMc to 0.

In the next step S25, the processing circuitry 51 determines whether the valve-closed time cumulated value TMc calculated in step S23 is greater than or equal to a predetermined determination time TMcTh. The determination time TMcTh is set as a criterion for determining whether the temperature of the tip 21A of the direct injection valve 21 has decreased due to the execution of the opening-closing process. When the valve-closed time cumulated value TMc is greater than or equal to the determination time TMcTh, it is considered that there is a possibility that the temperature of the tip 21A has sufficiently decreased. When the valve-closed time cumulated value TMc is less than the determination time TMcTh, it is considered that the decrease in the temperature of the tip 21A is not sufficient. Thus, when the valve-closed time cumulated value TMc is greater than or equal to the determination time TMcTh (S25: YES), the processing circuitry 51 returns the process to step S11. That is, the processing circuitry 51 ends the opening-closing process. When the valve-closed time cumulated value TMc is less than the determination time TMcTh (S25: NO), the processing circuitry 51 shifts the process to step S27. That is, the processing circuitry 51 continues the opening-closing process.

In step S27, the processing circuitry 51 determines whether the supplied fuel pressure Pinj is less than or equal to a pressure lower limit value PinjL. The fuel injection amount of the direct injection valve 21 is determined by the pressure of the fuel supplied to the direct injection valve 21 and the length of the energization time to the direct injection valve 21. Thus, if the pressure of the fuel supplied to the direct injection valve 21 is excessively low, an appropriate amount of hydrogen gas cannot be supplied to the combustion chamber 13 by one fuel injection of the direct injection valve 21. Accordingly, the pressure lower limit value PinjL is set as a criterion for determining whether an appropriate amount of hydrogen gas can be supplied to the combustion chamber 13 by one fuel injection. When the supplied fuel pressure Pinj is greater than the pressure lower limit value PinjL, it is considered that an appropriate amount of hydrogen gas can be supplied to the combustion chamber 13 by one fuel injection. When the supplied fuel pressure Pinj is less than or equal to the pressure lower limit value PinjL, it is determined that there is a possibility that an appropriate amount of hydrogen gas cannot be supplied to the combustion chamber 13 by one fuel injection. Thus, when the supplied fuel pressure Pinj is greater than the pressure lower limit value PinjL (S27: NO), the processing circuitry 51 returns the process to step S23. In this case, the processing circuitry 51 continues the closed state of the shut-off valve 25. When the supplied fuel pressure Pinj is less than or equal to the pressure lower limit value PinjL (S27: YES), the processing circuitry 51 shifts the process to step S29.

In step S29, the processing circuitry 51 opens the shut-off valve 25. Then, the processing circuitry 51 shifts the process to step S31.

In step S31, the processing circuitry 51 determines whether the supplied fuel pressure Pinj becomes greater than the pressure determination value PinjTh. The pressure determination value PinjTh is set to a pressure greater than or equal to the pressure lower limit value PinjL. That is, the pressure determination value PinjTh may be equal to the pressure lower limit value PinjL or may be greater than the pressure lower limit value PinjL. When the supplied fuel pressure Pinj is greater than the pressure determination value PinjTh, it is determined that an appropriate amount of hydrogen gas can be supplied to the combustion chamber 13 by one fuel injection. Thus, when the supplied fuel pressure Pinj becomes greater than the pressure determination value PinjTh (S31: YES), the processing circuitry 51 returns the process to step S21. In this case, the processing circuitry 51 sets the shut-off valve 25 to the closed state. When the supplied fuel pressure Pinj is less than or equal to the pressure determination value PinjTh (S31: NO), the processing circuitry 51 repeats the determination of step S31 until the supplied fuel pressure Pinj becomes greater than the pressure determination value PinjTh. In this case, the processing circuitry 51 maintains the shut-off valve 25 in the open state.

Control of Direct Injection Valve

Figure 4:
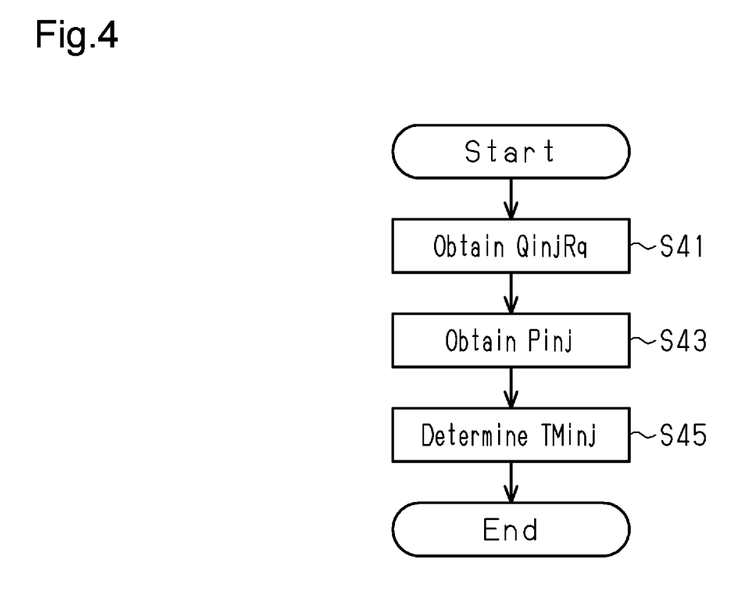
FIG. 4 is a flowchart illustrating a processing routine executed by the controller included in the gaseous fuel supply device of FIG. 1.

Referring to FIG. 4, a processing routine illustrating the flow of processes executed by the processing circuitry 51 to determine an energization time TMinj for the direct injection valve 21 will now be described. While the internal combustion engine 10 is running, the processing circuitry 51 repeatedly executes the processing routine.

In step S41, the processing circuitry 51 obtains a requested injection amount QinjRq, which is a requested value of the fuel injection amount of the direct injection valve 21. For example, the processing circuitry 51 obtains the fuel injection amount corresponding to the target value of the air-fuel ratio and the intake air amount GA as the requested injection amount QinjRq.

In step S43, the processing circuitry 51 obtains the supplied fuel pressure Pinj.

In step S45, the processing circuitry 51 determines the energization time TMinj for the direct injection valve 21, which corresponds to the length of the opening period of the direct injection valve 21, based on the requested injection amount QinjRq and the supplied fuel pressure Pinj. The processing circuitry 51 increases the energization time TMinj as the requested injection amount QinjRq increases.

The processing circuitry 51 increases the energization time TMinj as the supplied fuel pressure Pinj decreases. Thereafter, the processing circuitry 51 temporarily ends the processing routine.

Operation and Advantage of First Embodiment

While the internal combustion engine 10 is running, the combustion gas burns in the combustion chamber 13. Thus, the tip 21A of the direct injection valve 21 is exposed to high-temperature combustion gas. As a result, the temperature of the tip 21A increases. When the injection valve temperature TPinj becomes greater than the temperature determination value TPinjTh, the processing circuitry 51 starts the opening-closing process.

When the opening-closing process is started, the shut-off valve 25 of the gaseous fuel supply device 20 is brought into the closed state. This limits the supply of the hydrogen gas in the storage tank 22 to the direct injection valve 21. Since the fuel injection of the direct injection valve 21 is continued even in this state, the pressure of the fuel supplied from the supply passage 23 to the direct injection valve 21 gradually decreases.

When the pressure of the fuel supplied to the direct injection valve 21 from the supply passage 23 decreases, the energization time TMinj for the direct injection valve 21 becomes longer even if the requested injection amount QinjRq is constant. Then, the time during which the hydrogen gas at a relatively low temperature flows through the direct injection valve 21 becomes longer. As a result, the temperature of the tip 21A of the direct injection valve 21 is likely to decrease.

When the supplied fuel pressure Pinj becomes less than or equal to the pressure lower limit value PinjL due to the shut-off valve 25 being closed, the shut-off valve 25 shifts to the open state. Then, the hydrogen gas in the storage tank 22 is supplied to the direct injection valve 21 through the supply passage 23. As a result, the pressure of the fuel supplied from the supply passage 23 to the direct injection valve 21 increases. This maintains a state in which an appropriate amount of hydrogen gas can be supplied from the direct injection valve 21 to the combustion chamber 13.

Thus, the gaseous fuel supply device 20 limits an increase in the temperature of the tip 21A of the direct injection valve 21 while allowing the internal combustion engine 10 to operate properly. That is, the gaseous fuel supply device 20 limits the reduction in the lifespan of the direct injection valve 21.

In the present embodiment, the following advantages are further obtained.

(1) When the energization time TMinj is increased by bringing the shut-off valve 25 into the closed state, the temperature of the tip 21A of the direct injection valve 21 decreases. Thus, when the valve-closed time cumulated value TMc, which is the cumulated value of the time during which the shut-off valve 25 is in the closed state as a result of the opening-closing process, reaches the determination time TMcTh, the processing circuitry 51 ends the opening-closing process. As described above, the processing circuitry 51 executes the opening-closing process until the valve-closed time cumulated value TMc becomes greater than or equal to the determination time TMcTh. This decreases the temperature of the tip 21A. Consequently, the gaseous fuel supply device 20 limits the reduction in the lifespan of the direct injection valve 21.

(2) Even when the valve-closed time cumulated value TMc becomes greater than or equal to the determination time TMcTh, there may be a case in which the injection valve temperature TPinj does not become less than or equal to the temperature determination value TPinjTh. In this case, in the gaseous fuel supply device 20, the processing circuitry 51 executes the opening-closing process again. This allows the gaseous fuel supply device 20 to sufficiently lower the temperature of the tip 21A of the direct injection valve 21.

(3) During the execution of the opening-closing process, the pressure of the fuel supplied from the supply passage 23 to the direct injection valve 21 decreases. Thus, during the execution of the opening-closing process, the injection pressure of the hydrogen gas in the direct injection valve 21 decreases. Such a decrease in the injection pressure reduces the pressure applied to the needle 31 when the direct injection valve 21 is closed. This reduces the impact load applied to the needle 31 when the nozzle hole 33 is closed by the needle 31. Thus, the film formed on the surface of the needle 31 is less likely to be worn.

Second Embodiment

A second embodiment of the gaseous fuel supply device will be described with reference to FIG. 5. The second embodiment is partially different from the first embodiment in the opening-closing process. Accordingly, differences from the first embodiment will mainly be described below. Like or the same reference numerals are given to those components that are the same as the corresponding components of the first embodiment. Such components will not be described.

Control of Shut-Off Valve

Figure 5:
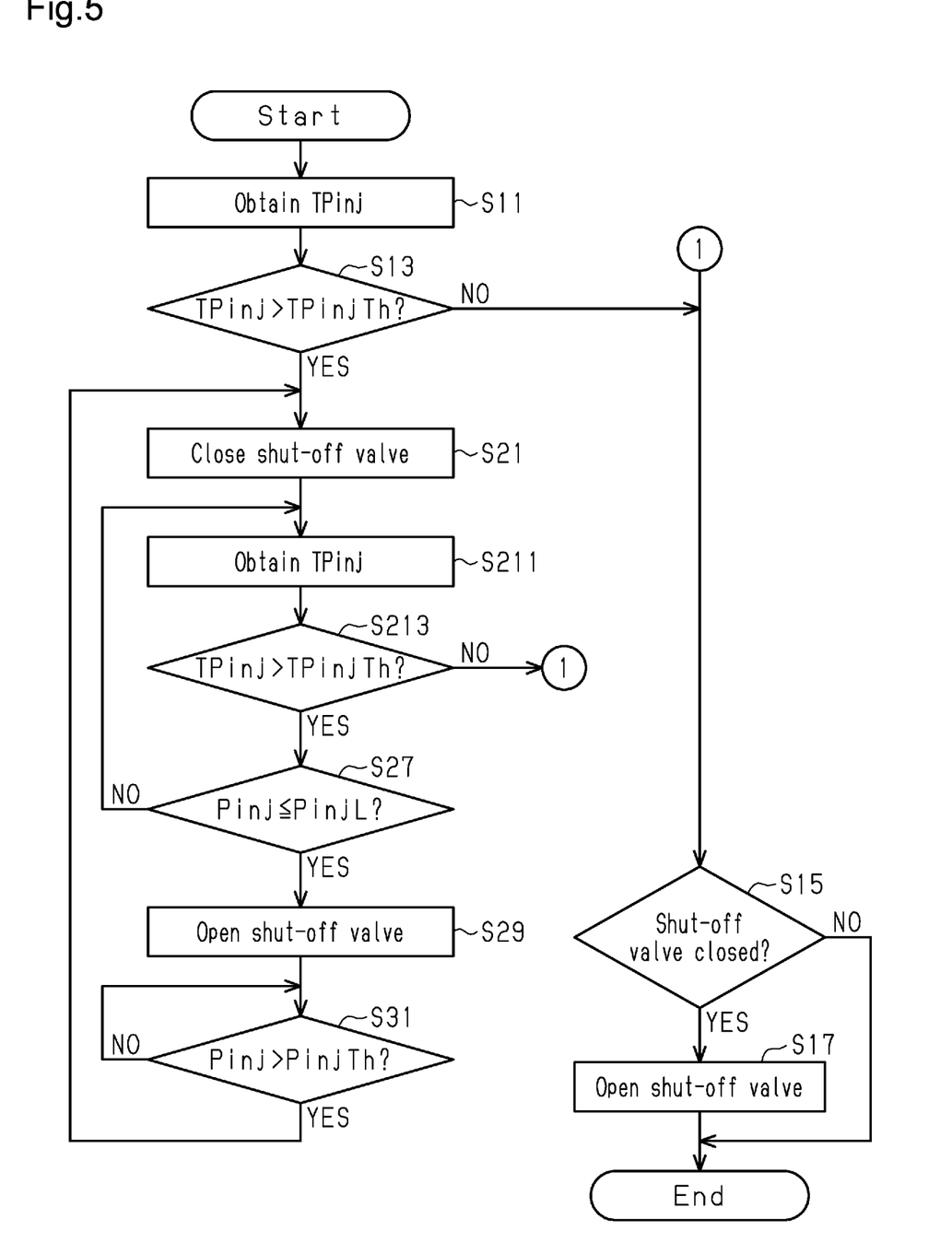
FIG. 5 is a flowchart illustrating a processing routine executed by the controller included in the gaseous fuel supply device according to a second embodiment.

Referring to FIG. 5, a processing routine illustrating the flow of processes executed by the processing circuitry 51 to control the shut-off valve 25 will now be described. While the internal combustion engine 10 is running, the processing circuitry 51 repeatedly executes the processing routine.

In step S11, the processing circuitry 51 obtains an injection valve temperature TPinj, which is the temperature of the tip 21A of the direct injection valve 21. In step S13, the processing circuitry 51 determines whether the injection valve temperature TPinj is greater than a temperature determination value TPinjTh. When the injection valve temperature TPinj is less than or equal to the temperature determination value TPinjTh (S13: NO), the processing circuitry 51 executes the processes of step S15 and step S17 and temporarily ends the processing routine. When the injection valve temperature TPinj is greater than the temperature determination value TPinjTh (S13: YES), the processing circuitry 51 starts the opening-closing process.

Specifically, in step S21, the processing circuitry 51 closes the shut-off valve 25. Subsequently, in step S211, the processing circuitry 51 obtains the injection valve temperature TPinj in the same manner as step S11. Then, in step S213, the processing circuitry 51 determines whether the injection valve temperature TPinj is greater than the temperature determination value TPinjTh in the same manner as step S13. When the injection valve temperature TPinj is greater than the temperature determination value TPinjTh (S213: YES), the processing circuitry 51 shifts the process to step S27. The flow of processes subsequent to step S27 is the same as that in the first embodiment and thus will not be described.

In step S213, when the injection valve temperature TPinj is less than or equal to the temperature determination value TPinjTh (S213: NO), the processing circuitry 51 shifts the process to step S15. That is, when the injection valve temperature TPinj becomes less than or equal to the temperature determination value TPinjTh as a result of executing the opening-closing process, the processing circuitry 51 ends the opening-closing process.

Advantages of Second Embodiment

In the present embodiment, in the same manner as the first embodiment, the gaseous fuel supply device 20 limits an increase in the temperature of the tip 21A of the direct injection valve 21 while allowing the internal combustion engine 10 to operate properly. That is, the gaseous fuel supply device 20 limits the reduction in the lifespan of the direct injection valve 21.

Further, the processing circuitry 51 continues the opening-closing process until the injection valve temperature TPinj becomes less than or equal to the temperature determination value TPinjTh. This allows the gaseous fuel supply device 20 to sufficiently lower the temperature of the tip 21A as a result of executing the opening-closing process. When the injection valve temperature TPinj becomes less than or equal to the temperature determination value TPinjTh, the opening-closing process is ended. This limits an excessive increase in the execution time of the opening-closing process.

Modifications

The above embodiments may be modified as follows. The above embodiments and the following modifications can be combined as long as the combined modifications remain technically consistent with each other.

In the first embodiment, the processing circuitry 51 may end the opening-closing process when the injection valve temperature TPinj becomes less than or equal to the temperature determination value TPinjTh even if the valve-closed time cumulated value TMc is less than the determination time TMcTh.

The processing circuitry 51 may determine that the pressure of the gaseous fuel supplied to the direct injection valve 21 is less than or equal to the pressure lower limit value when the duration of the closed state of the shut-off valve 25 reaches a specified time in the opening-closing process, and may then open the shut-off valve 25.

When a fuel injection valve incorporating a temperature sensor that detects the temperature of the tip is employed as the direct injection valve, the processing circuitry 51 may obtain a detection value of the temperature sensor as the injection valve temperature TPinj.

The gaseous fuel supply device may be a device that supplies gaseous fuel other than hydrogen gas to the internal combustion engine. The other gaseous fuel may be, for example, compressed natural gas.

The processing circuitry 51 is not limited to a device that includes a CPU and a ROM and executes software processing. That is, the processing circuitry 51 may be modified as long as it has any one of the following configurations (a) to (c).

(a) The processing circuitry 51 includes one or more processors that execute various processes in accordance with a computer program. The processor includes a CPU and a memory, such as a RAM and ROM. The memory stores program codes or instructions configured to cause the CPU to execute the processes. The memory, or a computer-readable medium, includes any type of medium that is accessible by general-purpose computers and dedicated computers.

(b) The processing circuitry 51 includes one or more dedicated hardware circuits that execute various processes. The dedicated hardware circuits include, for example, an application specific integrate circuit (ASIC) and a field programmable gate array (FPGA).

(c) The processing circuitry 51 includes one or more processors that execute part of various processes in accordance with a computer program and one or more dedicated hardware circuits that execute the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A gaseous fuel supply device for an internal combustion engine having a cylinder, the gaseous fuel supply device comprising:
   a direct injection valve configured to inject gaseous fuel into the cylinder;
   a storage tank configured to store gaseous fuel;
   a supply passage configured to guide the gaseous fuel from the storage tank to the direct injection valve;
   a pressure reducing valve disposed in the supply passage and configured to reduce a pressure of the gaseous fuel that has flowed out from the storage tank to the supply passage;
   a shut-off valve disposed in a portion of the supply passage downstream of the pressure reducing valve, the shut-off valve being configured to be switched between an open state in which supply of the gaseous fuel to the direct injection valve is permitted and a closed state in which supply of the gaseous fuel to the direct injection valve is stopped; and
   processing circuitry configured to control the direct injection valve and the shut-off valve, wherein
   the processing circuitry is configured to:
      determine an energization time for the direct injection valve based on the pressure of the gaseous fuel supplied from the supply passage to the direct injection valve and a requested value of an injection amount of the gaseous fuel from the direct injection valve; and
      when a temperature of the direct injection valve becomes greater than a temperature determination value during operation of the internal combustion engine, start an opening-closing process that repeatedly switches the shut-off valve between the closed state and the open state, and
   the opening-closing process is a process that brings the shut-off valve into the closed state when the pressure of the gaseous fuel supplied from the supply passage to the direct injection valve is greater than a pressure lower limit value and brings the shut-off valve into the open state when the pressure of the gaseous fuel supplied to the direct injection valve becomes less than or equal to the pressure lower limit value.

2. The gaseous fuel supply device according to claim 1, wherein the processing circuitry is configured to end the opening-closing process when a cumulated value of a time during which the shut-off valve is in the closed state as a result of the opening-closing process reaches a predetermined determination time.

3. The gaseous fuel supply device according to claim 1, wherein the processing circuitry is configured to end the opening-closing process when the temperature of the direct injection valve becomes less than or equal to the temperature determination value.

* * * * *